United States Patent
Becerra et al.

(10) Patent No.: US 7,050,566 B2
(45) Date of Patent: May 23, 2006

(54) CALL PROCESSING SYSTEM

(75) Inventors: Manuel Becerra, Miami, FL (US);
Charles Thompson, Atlanta, GA (US);
Glenn McMillan, Snellville, GA (US)

(73) Assignee: Assurant, Inc., New York, NY (US)

( * ) Notice: Subject to any disclaimer, the term of this patent is extended or adjusted under 35 U.S.C. 154(b) by 5 days.

(21) Appl. No.: 10/461,071

(22) Filed: Jun. 13, 2003

(65) Prior Publication Data

US 2004/0252823 A1 Dec. 16, 2004

(51) Int. Cl.
*H04M 3/00* (2006.01)

(52) U.S. Cl. ............ 379/265.12; 379/266.08

(58) Field of Classification Search ......... 379/265.01
See application file for complete search history.

(56) References Cited

U.S. PATENT DOCUMENTS

| | | | |
|---|---|---|---|
| 5,206,903 A | 4/1993 | Kohler et al. | |
| 5,592,542 A | 1/1997 | Honda et al. | |
| 5,684,872 A | 11/1997 | Flockhart et al. | |
| 5,784,452 A | 7/1998 | Carney | |
| 5,825,869 A | 10/1998 | Brooks et al. | |
| 5,903,641 A | 5/1999 | Tonisson | |
| 6,064,731 A | 5/2000 | Flockhart et al. | |
| 6,088,441 A | 7/2000 | Flockhart et al. | |
| 6,163,607 A | 12/2000 | Bogart et al. | |
| 6,173,053 B1 | 1/2001 | Bogart et al. | |
| 6,222,920 B1 | 4/2001 | Walker et al. | |
| 6,278,777 B1 | 8/2001 | Morley et al. | |
| 6,310,951 B1 | 10/2001 | Wineberg et al. | |
| 6,314,177 B1 | 11/2001 | Davis et al. | |
| 6,324,282 B1 | 11/2001 | McIllwaine et al. | |
| 6,356,632 B1 | 3/2002 | Foster et al. | |
| 6,389,400 B1 | 5/2002 | Bushey et al. | |
| 6,424,709 B1 | 7/2002 | Doyle et al. | |
| 6,434,230 B1 | 8/2002 | Gabriel | |
| 6,453,038 B1 | 9/2002 | McFarlane et al. | |
| 6,459,787 B1 | 10/2002 | McIllwaine et al. | |
| 2001/0011228 A1 | 8/2001 | Shenkman | |
| 2002/0087393 A1 * | 7/2002 | Philonenko | 705/11 |
| 2002/0110234 A1 | 8/2002 | Walker et al. | |
| 2002/0143661 A1 | 10/2002 | Tumulty et al. | |
| 2004/0103089 A1 * | 5/2004 | Lane et al. | 707/3 |

FOREIGN PATENT DOCUMENTS

| | | |
|---|---|---|
| EP | 0 755 144 A2 | 1/1997 |
| EP | 0 949 793 A1 | 10/1999 |

OTHER PUBLICATIONS

White Paper, Spherion Pacific Enterprises LLC, "The Call Center Becomes a Revenue Generator", Spherion, pp. 1–8.

White Paper, Vijay Mehrotra, Blue Pumpkin, "Skills–Based Routing in the Modern Contact Center", pp. 1–10, www.bluepumpkin.com.

(Continued)

*Primary Examiner*—Creighton Smith
(74) *Attorney, Agent, or Firm*—Alston & Bird LLP

(57) ABSTRACT

A system that is configured for determining the value of one or at least one incoming call and routing the call for processing based on this determined value. In one embodiment, the system routes very low value calls to an automated system for processing, and directs all other calls to human operators for processing. In another embodiment, the system assigns at least one agent to one or more of a plurality of groups of agents based on the agent's talent for performing a particular task. For example, the most talented agents at handling a particular type of call are assigned to a first group, and the second most talented agents at handling this type of call are assigned to a second group. In one embodiment, the most important calls are routed to the first, "most talented" group for processing, and less important calls are routed to the second group for processing.

67 Claims, 5 Drawing Sheets

OTHER PUBLICATIONS

White Paper, Zeacom, "Building the Small Contact Center", Zeacom Limited, pp. 1–12.

White Paper, John A. Gordon, Venture Development Corporation, "An Executive White Paper for Suppliers of Call Center Technology", pp. 1–10.

White Paper, Remedy, "Mastering the Complexity of Customer Service and Support Processes", pp. 1–10.

White Paper, eOn communications, "Multi–Media Contact Center Solutions: You Don't Have to Compromise", pp. 1–13.

White Paper, Stonesoft, "Multi–Link Technology", pp. 1–12 and 15, www.stonesoft.com.

White Paper, Pass Consulting Group, "Call Center—Your Customer Contact Point", Aschaffenburg, Germany, pp. 1–7, www.pass–consulting.com.

White Paper, Bindi Bhullar, PeachTrac; "CRM White Paper", pp. 1–4, www.peachtrac.com.

White Paper, Brann Data; "CRM 101: Retaining Customers Through Relationship Management;" White Paper, pp. 1–12, www.branndata.com.

Wintouch eCRM, "A White Paper from Touchstone Corporation, CRM is Like an Outboard Motor", pp. 1–5, www.wintouch.com/rowboat.com.

White Paper, The CRM Phenomenon; Magic, pp. 1–16, www.magic–sw.com.

White Paper, Anthony S. Bagdonis, Ph.D.; "Functionality of CRM Associate", Applied Systems Intelligence, Inc., pp. 1–7.

White Paper, Jeffrey Peel, "Financial Services And Customer Relationship Management", Quadriga Consulting, pp. 1–20, www.quadrigaconsulting.com.

Ger Koole, White Paper, "An Introduction To Call Center Modeling", pp. 1–66.

White Paper, Avaya "A complete Contact Management Solution for Voice, Email and Web Interaction", pp. 1–7.

White Paper, Angela Small, Avaya, "Interaction Center 5.6 Reporting White Paper", pp. 1–11.

White Paper, Avaya "Managed CRM: Outstanding Processes, Outstanding Avaya Platform", pp. 1–4.

White Paper, Avaya "Avaya Call Management System", pp. 1–18.

White Paper, Avaya, "Avaya Customer Relationship Management Solutions", pp. 1–6.

Press Release, Aspect, "Aspect Communications Meets Needs of Small and Mid–Sized Enterprises with Iphinity.", pp. 1–3, www.aspects.com.

White Paper, Aspect, "Aspect Administration and Development Tools.", pp. 1–4.

E.Piphany Web Site, "E.Piphany Business Solutions—Customer Retention", pp. 1–2, www.epiphany.com.

E.Piphany Web Site, "E.Piphany Business Solutions—Cross–Sell/Up–Sell", pp. 1–2, www.epiphany.com.

E.Piphany Web Site, "E.Piphany Business Solutions—Sale Effectiveness", pp. 1–2, www.epiphany.com.

E.Piphany Web Site, "E.Piphany Business Solutions—Customer Acquisition", pp. 1–2, www.epiphany.com.

E.Piphany Web Site, "Epiphany E.6 Overview", pp. 1–3, www.epiphany.com.

Kana Web Site, Kana, "Corporate Overview", pp. 1–2, www.kana.com/about/about.aspx.

Kana Web Site, Kana, "Consumer Financial Services", pp. 1–2, www.kana.com/solution/industrysolutions/financial/index1.aspx.

Kana Web Site, Kana, "Kana Contact Center Management", pp. 1–2, www.kana.com/solution/service.aspx.

Kana Web Site, Kana, "Kana Service Resolution Management", pp. 1–2, www.kana.com/solution/servicesolution/srm/default.aspx.

Kana Web Site, Kana, "KANA Campaign Automation", pp. 1–2, www.kana.com/solution/marketingsolution/campauto.aspx.

Kana Web Site, Kana, "KANA Marketing Analytics", pp. 1–2, www.kana.com/solution/marketingsolution/markanalytics.aspx.

White Paper, Kana, "Empowering Enterprises to Deliver Outstanding Customer Service at Lower Costs.", pp. 1–4, www.kana.com.

Siebel Web Site; Siebel, "Company Information", p. 1, www.siebel.com/about/index.shtm.

Siebel Web Site, Siebel, "Fast CRM Deployments", pp. 1–3, www.siebel.com/about/customer_case_studies/rapid_deployment.shtm.

Siebel Web Site, Siebel, "Siebel Call Center", pp. 1–2, www.siebel.com/products/service/call_center/index.shtm.

White Paper, Siebel, "Enabling the Customer–Driven Enterprise", pp. 1–26.

White Paper, Verint, "Outsourcing Your Contact Center", pp. 1–12, www.verint.com., pp. 1–8.

Art Rosenberg, "Skills–based Routing to Best agent? Not!", pp. 1–4, www.commweb.com/shared/article/showArticle.jhtml?articleId=13100627&classroom.

Art Rosenberg, "Reader Response: Skill–based Routing", pp. 1–7, www.commweb.com/shared/article/showArticle.jhtml?articleId=14700154&classroom.

Brad Wilson, E.piphany, "Customer–Value Based Call Routing: A Key Strategy for Upgrading Your Contact Center", pp. 1–5.

White Paper, AS&K, "Make Skills–Based Routing Happen", pp. 1–3.

White Paper, Nortel Networks, "Beyond ACD–The advantages of skill–based routing in today's contact centers", pp. 1–12.

White Paper, Nortel Networks, "Network Skill–Based Routing", pp. 1–16.

White Paper, "DSC Tech Library", Database Systems Corporation, pp. 1–15, www.databasesystemscorp.com.

Lyn Kramer, Contact Professional Magazine, "The Business Case for Skill–Based Routing", pp. 1–4, www.contactprofessional.com/issues/article.asp?ID=156.

Fred Manus, Health Management Technology, "Call Center Strategies for Tomorrow", pp. 1–3, www.healthmgttech.com/archives/h0900strategies.htm.

CustomerServiceGroup.com web site; Editor's Note and "Skills Based Routing: An Industry Survey", pp. 1–4, www.CustomerServiceGroup.com.

Gamm S: "Im Gespraech Mit Der Maschine" Net—Zeitschrift Fuer Kommunikationsmanagement, Huthig Verlag, Heilderberg, DE, vol. 53, No. 7, 1999, pp. 34–38.

International Search Report from corresponding International Application No. PCT/US2004/019117 dated Nov. 5, 2004.

* cited by examiner

CALL PROCESSING SYSTEM

BACKGROUND OF THE INVENTION

Known systems and methods for processing incoming calls are described in U.S. Pat. Nos. 5,206,903, 5,592,542, 5,903,641 and 6,088,441, which are hereby incorporated by reference. Although these systems have some use in processing incoming calls, there is a need for improved call processing systems. For example, there is a need for an improved call processing system that processes calls more efficiently and effectively than current call processing systems.

SUMMARY OF THE INVENTION

One embodiment of the invention comprises a call processing system that is configured for assessing a priority of an incoming call, and determining whether to route the incoming call to an automated call processing system based on the assessed priority. In a particular embodiment of the invention, the system is also configured for determining whether to route the incoming call to a human operator for processing based on the priority of the incoming call.

A call processing system according to another embodiment of the invention is configured for: (1) receiving data related to an incoming call; (2) assigning a priority value to the incoming call based on the data; and (3) using the priority value to determine whether to route the incoming call to an automated call processing system. In this embodiment of the invention, the system may be configured for routing the incoming call to the automated call processing system in response to determining, based on the priority value, to route the incoming call to the automated call processing system. In a particular embodiment of the invention, the system is configured for using the priority value to determine whether to route the incoming call to a human operator for processing.

A call processing system according to yet another embodiment of the invention is configured for: (1) receiving a call from a customer, the call being related to the cancellation of a service; (2) determining whether it would be beneficial to attempt to persuade the customer not to cancel the service; and (3) in response to determining that it would not be beneficial to attempt to persuade the customer not to cancel the service, routing the call to an automated call processing system. In one embodiment of the invention, the step of determining whether it would be beneficial to attempt to persuade the customer not to cancel the service comprises assessing whether an account associated with the call is likely to be profitable in the future. In another embodiment of the invention, the step of determining whether it would be beneficial to attempt to persuade the customer not to cancel the service comprises assessing whether an account associated with the call has been profitable in the past.

A call processing system according to a further embodiment of the invention is configured for processing calls related to a service (such as an insurance policy) from one or more customers, and allowing at least one of the customers to cancel the service substantially without the assistance of a human operator.

A call processing system according to yet another embodiment of the invention is configured for: (1) receiving information related to an incoming call; (2) using the information to determine whether it would be beneficial to have a human representative handle the incoming call; and (3) in response to determining that it would not be beneficial to have a human representative handle the incoming call, routing the call to an automated call processing system. In one embodiment of the invention, the system is configured for, in response to determining that it would be beneficial to have a human representative handle the incoming call, routing the call to a human representative for processing.

A call processing system according to a further embodiment of the invention is configured for: (1) assessing the importance of an incoming call; and (2) routing the incoming call to a particular group of agents for processing based on the importance of the incoming call. In one embodiment of the invention, at least one particular agent within the group of agents is assigned to the group of agents based on the particular agent's talent for performing one or more particular tasks. In a particular embodiment of the invention, this talent is the particular agent's talent for persuading customers not to cancel a service.

In one embodiment of the invention, the system is configured for measuring the particular agent's talent for persuading customers to retain a service based on data comprising the length of time that one or more customers retained a service after speaking with the particular agent. In a further embodiment of the invention, the system is configured for measuring the particular agent's talent for persuading customers to retain a service based, at least in part, on the particular agent's call save rate for one or more days. In yet another embodiment of the invention, the system is configured for measuring the particular agent's talent for persuading customers to retain a service based, at least in part, on the particular agent's saved revenue value for one or more days.

A call processing system according to yet another embodiment of the invention is configured for: (1) assessing the importance of an incoming call; and (2) routing the incoming call to a particular group of agents for processing based on the importance of the incoming call, wherein at least one particular agent within the group of agents has been assigned to the group of agents based on the particular agent's save rate performance.

A call processing system according to another embodiment of the invention is configured for: (1) assessing the importance of an incoming call; and (2) routing the incoming call to a particular group of agents for processing based on the importance of the incoming call, wherein at least one particular agent within the group of agents has been assigned to the group of agents based on a the particular agent's retention rating.

A method of routing a call for processing according to one embodiment of the invention comprises: (1) identifying, from a plurality of agents, a group of one or more "most talented" agents who are among the most talented agents within the plurality of agents at performing at least one task; (2) assessing the value of a particular call (such as an incoming call); and (3) determining whether to route the particular call to the group of "most talented agents" for processing based on the assessed value of the particular call. This method may further comprise routing the particular call to the group of "most talented agents" in response to determining that the particular call is a relatively high-value call. In one embodiment of the invention, the "at least one task" referenced above comprises persuading a customer not to cancel a service. A method according to a particular embodiment of the invention may further comprise: (1) identifying, from the plurality of agents, a group of one or more "least talented" agents who are among the least talented agents within the plurality of agents at performing one or more tasks; and (2) determining whether to route the particular call to the group of "least talented agents" for processing based on the assessed value of the particular call.

A method of routing a call for processing according to yet another embodiment of the invention comprises: (1) identifying, from a plurality of agents, a group of one or more "least talented" agents who are among the least talented agents within the plurality of agents at performing one or more tasks; (2) assessing the value of a particular call; and (3) determining whether to route the particular call to the group of "least talented agents" for processing based on the assessed value of the particular call. This method may further comprise routing the call to the group of "least talented agents" in response to determining that the call is a relatively low-value call.

A method of routing calls according to yet another embodiment of the invention comprises: (1) assigning a first talent rating to a first agent; (2) assigning a second talent rating to a second agent; (3) assigning a third talent rating to a third agent; (4) in response to the first talent rating being above a pre-determined first threshold value, assigning the first agent to a first group of agents; (5) in response to the second talent rating being below a pre-determined second threshold value, assigning the second agent to a second group of agents; (6) in response to the third talent rating being below the first threshold value and above the second threshold value, assigning the third agent to a third group of agents; (7) determining a value of a call; and (8) routing a call to a selected one of the first, second, or third groups of agents based, at least in part, on the value of the call. In one embodiment of the invention, at least one of the first, second, or third talent ratings corresponds to an agent's ability to persuade a customer to retain a service. In another embodiment of the invention, at least one of the first, second, or third talent values corresponds to an agent's ability to persuade a customer not to cancel a service.

A method of routing a correspondence for processing according to one embodiment of the invention comprises: (1) identifying, from a plurality of agents, a group of one or more "most talented" agents who are among the most talented agents within the plurality of agents at performing at least one task; (2) assessing the value of a particular correspondence; and (3) determining whether to route the particular correspondence to the group of "most talented agents" for processing based on the assessed value of the particular call. In a particular embodiment of the invention, this method further comprises: (1) identifying, from the plurality of agents, a group of one or more "least talented" agents who are among the least talented agents within the plurality of agents at performing one or more tasks; and (2) determining whether to route the particular call to the group of "least talented agents" for processing based on the assessed value of the particular call.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described in greater detail with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the relevant field. Like numbers refer to like elements throughout.

As will be appreciated by one skilled in the relevant field, the present invention may be embodied, for example, as a method, a data processing system, or a computer program product. Accordingly, the present invention may take the form, for example, of an entirely hardware embodiment, an entirely software embodiment, or an embodiment having both software and hardware components. Furthermore, the present invention may take the form of a computer program product on a computer-readable storage medium having computer-readable program code embodied in the storage medium. Any suitable computer-readable storage medium may be utilized including hard disks, CD-ROMs, optical storage devices, or magnetic storage devices.

The present invention is described below with reference to block diagrams and flowchart illustrations of methods, apparatuses (e.g., systems) and computer program products according to various embodiments of the invention. It will be understood that each block of the flowchart illustrations, and combinations of blocks of these flowchart illustrations, can be implemented by computer program instructions. These computer program instructions may be loaded onto a general purpose computer, special purpose computer, or other programmable data processing apparatus to produce a machine to implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions for implementing the functions specified in the various flowchart block or blocks. The computer program instructions may also be loaded onto a computer or other programmable data processing apparatus to cause a series of operational steps to be performed on the computer or other programmable apparatus to produce a computer implemented process. In such an embodiment of the invention, the instructions that are executed on the computer or other programmable apparatus may serve to implement the functions specified in the flowchart block or blocks.

Accordingly, blocks of the block diagrams and flowchart illustrations and the text of this patent application support systems and methods for performing the specified functions, as well as computer readable media storing computer-executable instructions for performing the specified functions. It will also be understood that each block within the flowchart illustrations, and combinations of blocks within the flowchart illustrations, can be implemented by special purpose hardware-based computer systems that perform the specified functions or steps, or by combinations of computer hardware and computer instructions.

System Architecture

Figure 1:
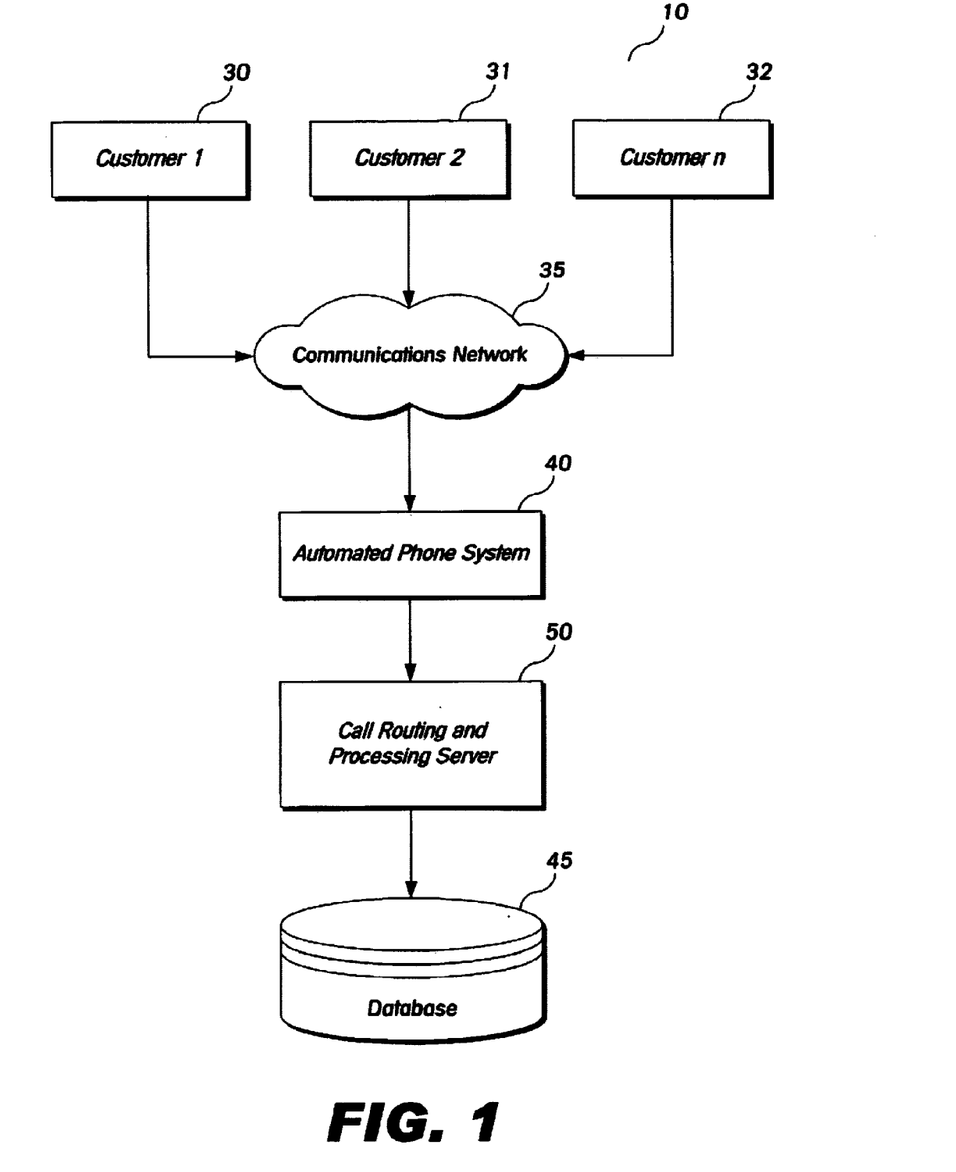
FIG. 1 is a block diagram of a call processing system according to one embodiment of the invention.

FIG. 1 shows a block diagram of a call processing system 10 according to one embodiment of the present invention. As may be understood from this figure, this exemplary call processing system 10 includes a Call Routing and Processing Server 50, a database 45, an automated phone system 40 (also known as an "automated attendant"), and one or more communications networks 35 for facilitating communication between one or more customers 30, 31, 32 and both the automated phone system 40 and the Call Routing and Processing Server 50. These one or more communications networks 35 may include any of a variety of types of networks such as a public switch telephone network (PSTN), the Internet, a private intranet, or any other type of suitable network. In one embodiment of the invention shown in FIG. 1, the communications network 35 comprises a public switch telephone network (PSTN).

Figure 2:
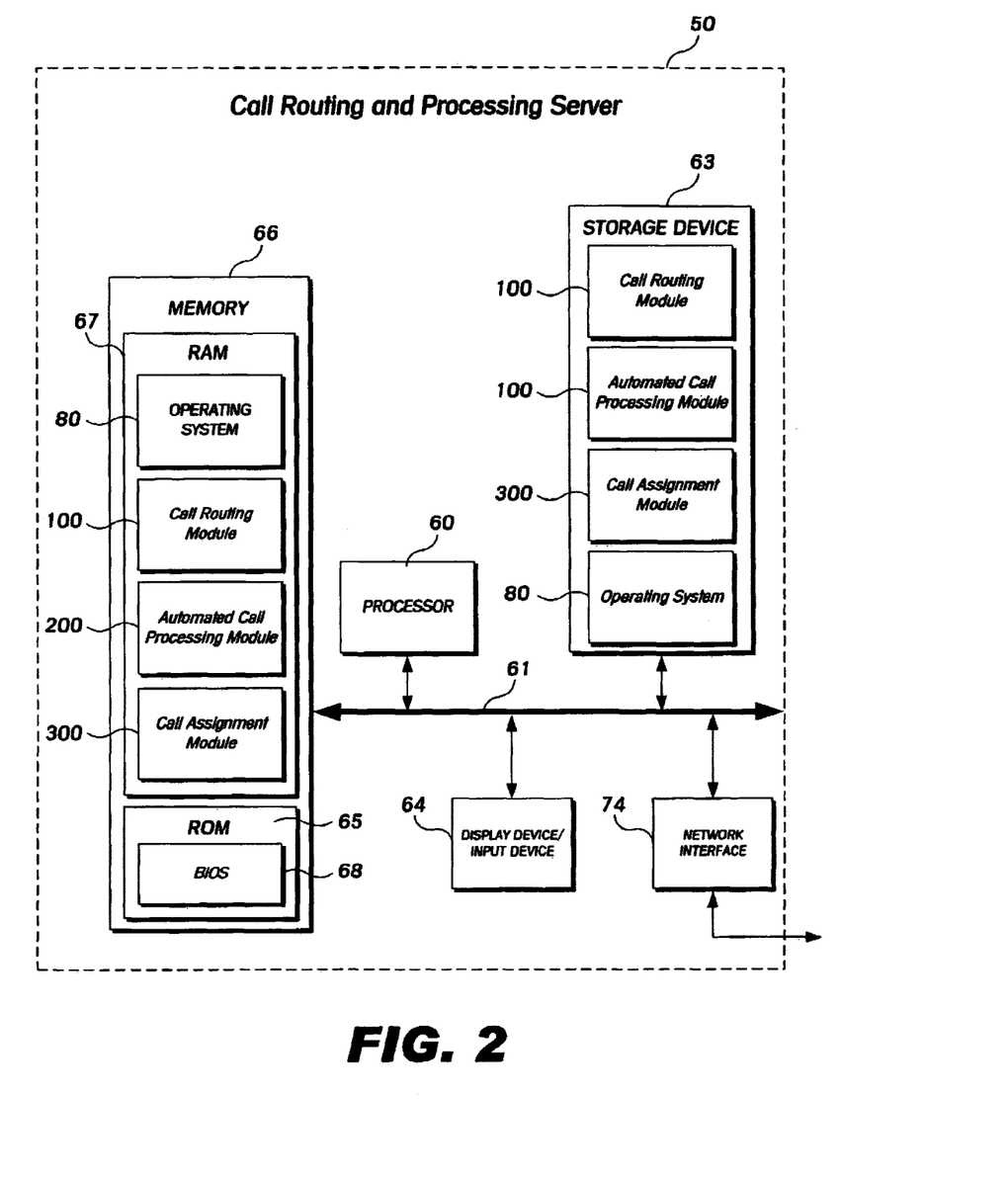
FIG. 2 is a block diagram of a call routing and processing server according to one embodiment of the invention.

FIG. 2 is a block diagram of an exemplary embodiment of the Call Routing and Processing Server 50 of FIG. 1. The Call Routing and Processing Server 50 includes a processor 60 that communicates with other elements within the Call Routing and Processing Server 50 via a system interface or bus 61. Also included in the Call Routing and Processing Server 50 is a display device/input device 64 for receiving and displaying data. This display device/input device 64 may be, for example, a keyboard or pointing device that is used in combination with a monitor. The Call Routing and Processing Server 50 further includes memory 66, which preferably includes both read only memory (ROM) 65 and random access memory (RAM) 67. The Call Routing and Processing Server's ROM 65 is used to store a basic input/output system 68 (BIOS) that contains the basic routines that help to transfer information between elements within the Call Routing and Processing Server 50.

In addition, the Call Routing and Processing Server 50 includes one or more storage devices 63, such as a hard disk drive, a floppy disk drive, a CD Rom drive, or optical disk drive, for storing information on one or more types of computer-readable media, such as hard disks, removable magnetic disks, or CD-ROM disks. As will be understood by one of ordinary skill in this field, each of these storage devices 63 is connected to the system bus 61 via an appropriate interface. The storage devices 63 and their associated computer-readable media provide nonvolatile storage for the Call Routing and Processing Server 50.

It should be understood that the computer-readable media described above may include any other suitable type of computer-readable media known in the art. Such media include, for example, magnetic cassettes, flash memory cards, digital video disks, and Bernoulli cartridges.

A number of program modules may be stored by the various storage devices and within the server's RAM 67. Such program modules include an operating system 80, a Call Routing Module 100, an Automated Call Processing Module 200, and a Call Assignment Module 300. The Call Routing Module 100, Automated Call Processing Module 200, and Call Assignment Module 300 control certain aspects of the operation of the Call Routing and Processing Server 50 with the assistance of the processor 60 and an operating system 80.

The Call Routing and Processing Server 50 also includes a network interface 74 for interfacing and communicating with other elements of a computer network. It will be appreciated by one of ordinary skill in this field that one or more of the Call Routing and Processing Server 50 components may be located geographically remotely from other Call Routing and Processing Server 50 components. Furthermore, one or more of the server's components may be combined, and additional components for performing functions described herein may be included in the Call Routing and Processing Server 50.

Definitions

For the purposes of this disclosure, a "saved call" occurs when an agent persuades a customer not to cancel a service or policy. For example, if a customer calls to cancel a particular insurance policy and an agent convinces the customer to not cancel the policy, the agent is credited with saving the call.

Overview of System Functionality

A system and method according to one embodiment of the invention is configured for routing and processing incoming telephone calls. For example, one embodiment of the invention is specifically configured for routing incoming telephone calls from customers who wish to cancel an existing insurance policy. However, as will be understood by one skilled in the related field, various different embodiments of the invention may be applied to routing many different types of telephone calls or other types of correspondence within many different industries. For example, various different embodiments of the invention may be applied to handling calls involving customer complaints, insurance claims, repair requests, or other types of calls or correspondence.

As noted above, a particular embodiment of the invention is configured for routing telephone calls from customers who wish to cancel an existing insurance policy. In this embodiment of the invention, incoming calls are first routed to an automated phone system 40. This automated phone system preferably determines the insurance policy at issue and verifies that the caller has the authority to make changes to the policy in a manner known in the art. For example, in one embodiment of the invention, the system prompts the user to enter their insurance policy number along with information that only the account holder (or someone closely associated with the account holder) would know. Such information may include, for example, a PIN number or the account holder's mother's maiden name. Alternatively, if the account holder is calling from their home phone, the system may use the account holder's home phone number to retrieve their account information from a database.

Call Routing Module

Figure 3:
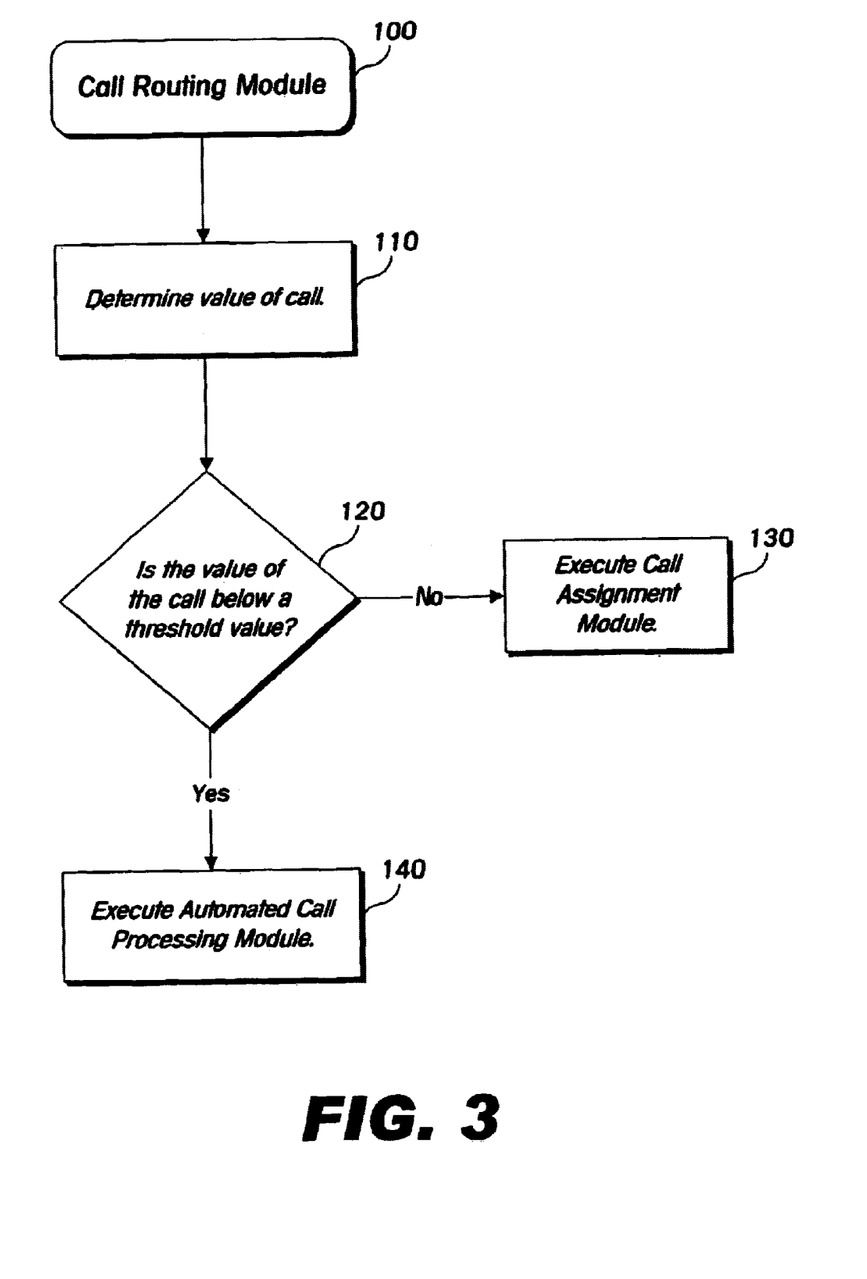
FIG. 3 is a flow chart that corresponds to a call routing module according to one embodiment of the invention.

Once the system has identified the caller's account number and verified that the caller has the authority to modify the account, the system executes a Call Routing Module 100, which is depicted in FIG. 3. As may be understood from this figure, when executing the call routing module 100, the system first executes Step 110 where it determines the value of the call.

As will be understood by one skilled in the related field, any appropriate technique may be used to assign a value to a particular incoming call. Such techniques may take into account, for example, various factors including: (1) the monetary value of the account that is the subject of the call; (2) the amount of time that the account has been open; (3) the payment history associated with the account; (4) the customer history associated with the account (for example, if the customer tends to complain persistently, the customer's account, and therefore the call, may be of less value than a similar account for a customer that does not frequently complain); (5) future indicators of the profitability of the account; and (6) one or more manually-assigned call priority indicators.

In one embodiment of the invention, the above factors are used to assign a numeric value rating to each incoming call.

For example, in one embodiment of the invention, each call is assigned a numeric value rating of 0 through 10, where 0 corresponds to a call of no value and 10 corresponds to an extremely valuable call. As will be understood by one skilled in the related field, a variety of different systems may be used for rating the various calls. These systems may involve, for example, assigning a numeric rating to the calls or simply associating the calls with a non-numerical priority indicator, such as "high value", "medium value", "low value" or "no value".

After the system has determined a value of the call at Step 110, the system then proceeds to Step 120 where it determines whether the determined value of the call is below a pre-determined threshold value. In one embodiment of the invention, the system does this by comparing the determined call value (which may, for example, be a numeric value) with a predetermined threshold value (which may also be a numeric value). If the determined call value is below the threshold value, the system proceeds to Step 140, where it executes an Automated Call Processing Module 140. The Automated Call Processing Module 140 allows the caller to take a requested action (such as canceling an insurance policy) without assistance from a human representative. Thus, in one embodiment of the invention, the system is configured to allow callers to cancel very low value insurance policies in an automated manner without first speaking with a customer service representative.

If the system determines, at Step 120, that the value of the call is not below the pre-determined threshold value, the system proceeds to Step 130 where it executes a Call Assignment Module 130. As discussed in greater detail below, the Call Assignment Module 300 routes the call to an appropriate group of customer service representatives (i.e., "agents") for processing. Thus, in one embodiment of the invention, the system is configured to require callers to speak to a customer service representative before canceling insurance policies that are not regarded as "very low value" policies. The Automated Call Processing Module 200 and the Call Assignment Module 300 are discussed in greater detail below.

Automated Call Processing Module

Figure 4:
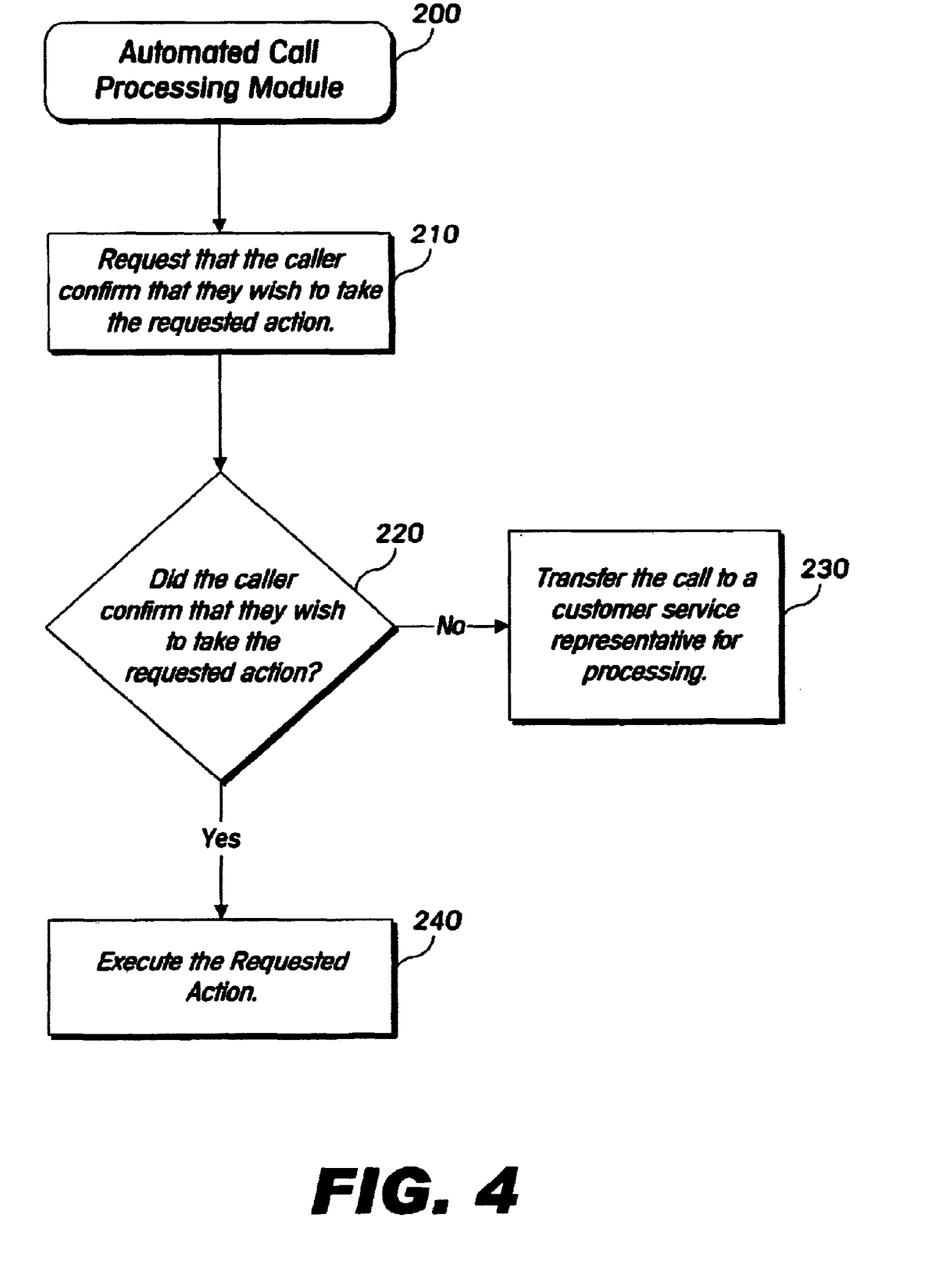
FIG. 4 is a flow chart that corresponds to an automated call processing module according to one embodiment of the invention.

FIG. 4 is a flow chart depicting an automated call processing module 200 according to one embodiment of the invention. As may be understood from this figure, at beginning Step 210, the system requests that the caller confirm that they wish to take the requested action. If the system determines, at Step 220, that the caller has confirmed that they wish to take the requested action, the system proceeds to Step 240 where it executes the requested action. However, if the system determines, at Step 220, that the caller has not confirmed that they wish to take the requested action, the system proceeds to Step 230, where it transfers the call to a customer service representative for processing.

In one embodiment of the invention, the system is configured to automatically process the cancellation of certain very low value insurance policies without human intervention. In this embodiment, at Step 210, the system requests that the customer confirm that they wish to cancel their insurance policy. If the customer confirms that they wish to cancel the policy, the system proceeds to Step 240 where it cancels the policy substantially without, and preferably entirely without, human intervention. However, if the system determines, at Step 220, that the customer has not confirmed that they wish to cancel the insurance policy, the system proceeds to Step 230 where it transfers the call to a customer service representative for processing.

As noted above, in one embodiment of the invention, the functionality described above is useful in automatically canceling low-value insurance policies (or other services) without substantial (and preferably entirely without) human intervention. This reduces the overall cost associated with processing these cancellations.

Call Assignment Module

Figure 5:
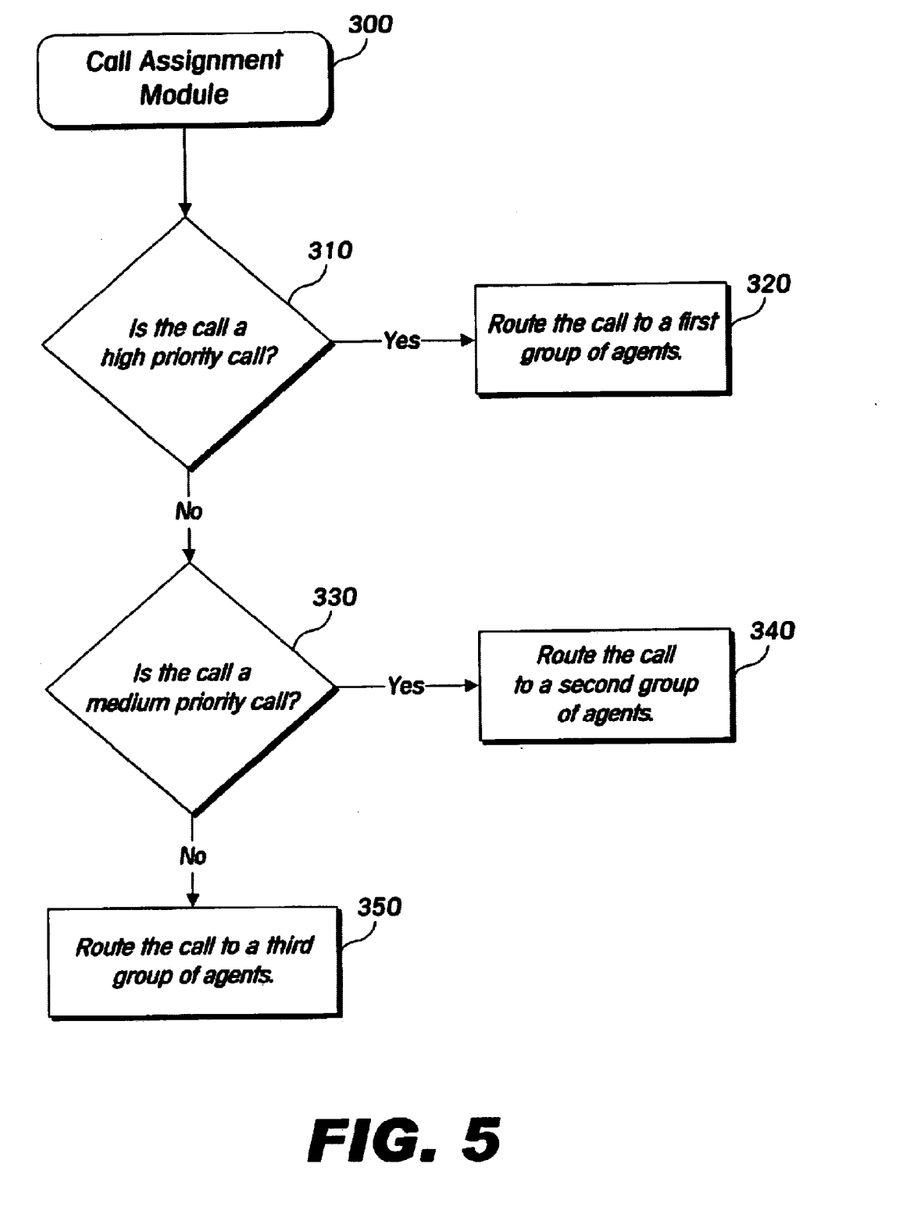
FIG. 5 is a flow chart that corresponds to a call assignment module according to one embodiment of the invention.

As noted above, in one embodiment of the invention, if the Call Routing Module 100 determines, at Step 120, that the value of an incoming call is not below a threshold value, the system proceeds to Step 130 where it executes a Call Assignment Module 300. FIG. 5 is a flow chart depicting an exemplary Call Assignment Module 300 according to one embodiment of the invention.

As may be understood from FIG. 5, when executing the Call Assignment Module 300, the system first proceeds to Step 310, where it determines whether the incoming call is a high priority call. The system may do this, for example, by comparing the call value determined at Step 110 (which, in one embodiment of the invention, is a numeric value) with a first pre-determined threshold value. If the value of the call is above this first threshold value, the system determines that the call is a "high priority" call and proceeds to Step 320 where it routes the call to a first group of agents for processing. However, if the value of the call is not above the first threshold value, the system determines that the call is not a high priority call and advances to Step 330.

At Step 330, the system determines whether the call is a medium priority call. In one embodiment of the invention, the system does this by comparing the call value determined at Step 110 (which, in one embodiment of the invention, is a numeric value) with a second pre-determined threshold value, which in one embodiment of the invention is lower than the first threshold value. If the call value is above this second threshold value, the system concludes that the call is a "medium priority" call and proceeds to Step 340 where it routes the call to a second group of agents for processing. However, if the call value is not above the second threshold value, the system determines that the call is a low priority call and advances to Step 350, where it routes the call to a third group of agents for processing.

In the manner described above, in one embodiment of the invention, the Call Assignment Module 300 serves to direct calls to different groups of agents based upon the priority of the calls. In one embodiment of the invention, the priority of the calls corresponds directly to the value of the call determined at Step 110. However, the priority of a call may be determined in any other appropriate way.

Techniques for Forming Agent Groups

In one embodiment of the invention, each agent from a pool of two or more agents is assigned to a first, second, or third agent group based upon the agent's talent at performing one or more particular tasks. For example, in one embodiment of the invention, agents are assigned to the various groups of agents based upon their talent for: (1) persuading customers not to cancel a service; and/or (2) persuading customers to retain a service for an extended period of time. More particularly, in one embodiment of the invention that is directed to processing calls related to the cancellation of insurance policies, agents may be assigned to one (or more) of the first, second, and third groups of agents, for example, based upon their talent for: (1) persuading customers not to cancel an existing insurance policy; and/or (2) persuading customers to retain an existing insurance policy.

In a particular embodiment of the invention, when dividing a pool of two or more available agents into various groups of agents, the system first assesses each age's talent for performing one or more particular tasks, such as the tasks mentioned above. In one embodiment of the invention, the system then assigns each agent a numerical "talent rating". Once this is done for all of the agents within a pool, the agents are ranked on the basis of their assigned talent rating.

Next, the system determines how many agents are needed within each particular agent group. The system may do this by agent group size requirements that have been entered manually into the system by a human group coordinator. Alternatively, the system may use historical data to estimate a predicted number of incoming "high value" calls that are to be handled by agents on a particular shift. The system may then use additional historical data, or other types of data, to estimate the number of agents needed to handle the estimated number of "high value" calls. The system then repeats this process to estimate the number of agents needed to handle the pre-determined number of "medium value" and "low value" calls.

In one embodiment of the invention, all (or a majority of) "high value" calls are preferably handled by an agent group that is made entirely of (or primarily of) the most talented agents from an available pool of one or more agents. In one embodiment of the invention, this agent group is referred to as a first group of agents. To form the first group of agents in this embodiment of the invention, the system identifies the number of agents needed handle the predicted number of "high value" calls, and then assigns this number of top-ranked agents to fill the first group of agents. For example, if the system determines that seven agents are needed process "high value" calls for a particular shift, the system will assign the seven highest ranked agents to fill the first group of agents for that particular shift.

In one embodiment of the invention, the system follows a similar approach to assigning agents to the group of agents that is to handle "medium value" calls, which in one embodiment of the invention is referred to as a second group of agents. In this embodiment of the invention, to form the second group of agents, the system identifies the number of agents needed to handle the predicted number of "medium value" calls, and then assigns this number of the remaining top-ranked agents (i.e., the top-ranked agents that remain after the first agent group has been filled) to fill the second group. For example, if the system determines that ten agents are needed process "medium value" calls for a certain shift, and if the system has assigned the first seven agents to the first group of agents, the system will assign the eighth through seventeenth highest-ranked agents to fill the second group of agents for that shift.

In one embodiment of the invention, the system follows a similar approach to assigning agents to the group of agents that is to handle "low value" calls, which in one embodiment of the invention is referred to as a third group of agents. In this embodiment of the invention, to form the third group of agents, the system identifies the number of agents needed to handle the predicted number of "low value" calls, and then assigns this number of the remaining top-ranked agents (i.e., the top-ranked agents that remain after the first and second agent groups have been filled) to fill the third group. For example, if the system determines that five agents are needed process "low value" calls for a certain shift, and if the system has assigned the first seventeen agents to the first and second groups of agents, the system will assign the eighteenth through twenty-second highest-ranked agents to fill the third group of agents for that shift.

In one embodiment of the invention, the various agents are ranked on the basis of a performance rating score that takes into account one or more of the following: (1) the agent's average daily save rate percentage; (2) the agent's average daily saved revenue percentage; and (3) the agent's average monthly persistency rate. In one particular embodiment of the invention, on a monthly basis, each agent is assigned a performance rating score that is based on all of these factors as calculated for the previous month. In one embodiment of the invention, all of these factors are weighted equally in assigning each agent a performance rating score. For example, in one embodiment of the invention, each agent's performance rating score is equal to the sum of the standardized values of: (1) the agent's average daily save rate percentage (e.g., for the previous month); (2) the agent's average daily saved revenue percentage (e.g., for the previous month); and (3) the agent's current average monthly persistency rate.

In one embodiment of the invention, an agent's daily save rate is equal to the number of calls that they "save" within a day divided by the number of calls that they handled within that same day that were eligible to be saved. Thus, if, in a particular day, an agent handled 200 calls that were eligible to be saved, and if the agent saved 100 of those eligible calls, the agent would have a daily save rate of 0.5, and a daily save rate percentage of 50%.

In one embodiment of the invention, an agent's daily saved revenue value is equal to the amount of revenue that an agent saved within a particular day (e.g., by persuading customers not to cancel an existing service) divided by the amount of revenue that the agent could have saved if they would have saved every call that they handled on that particular day. Accordingly, if, in a particular day, a particular agent saved 50 calls corresponding to a total of $1,000 worth of revenue, but handled a total of 200 calls corresponding to a total of $4,000 worth of revenue, the agent's daily saved revenue value for that particular day would be 0.25 and the agent's daily saved revenue percentage would be 25%.

In a particular embodiment of the invention, an agent's persistency rating is a numerical value based on the total number of months that the agent's previous "saves" remain in effect. In this embodiment of the invention, a "save" remains in effect for as long as the account or service at issue in a particular "saved" call remains in effect. For example, if a customer calls to cancel a particular insurance policy and an agent convinces the customer to not cancel the policy, the agent is credited with saving the call. If the customer then waits for six months after speaking with the agent to cancel the policy, the agent's "save" will be regarded as having remained in effect for six months.

In one embodiment of the invention, the various available agents are ranked based upon their performance rating score and then assigned to one or more groups of agents based upon this performance rating score. For example, in one embodiment of the invention, each agent of a plurality of agents (e.g., the total pool of available agents) is assigned to a particular one of a plurality of agent groups (e.g., 3 groups) based upon their performance rating score. In a particular embodiment, the available agents that are ranked within the top 30% of these agents (e.g., based on their performance rating score) are assigned to a "high-value call" agent group. Similarly, the available agents that are ranked within the bottom 30% of the agents (e.g., based on their performance rating score) are assigned to a "low-value call" agent group. All of the other agents are then assigned to a "medium-value call" agent group. In one embodiment, all new agents are placed into the "low-value call" agent group until their performance rating score is sufficient to place them in another group.

Call Routing Techniques

As may be understood from the discussion above, and particularly in light of FIG. 5, in one embodiment of the invention, the system routes calls so that high priority calls are handled by a group of agents that are the most talented at handling a particular type of call (e.g., a call requesting cancellation of an insurance claim). Similarly, medium priority calls are handled by a second-most talented group of agents, and low priority calls are handled by a third-most talented group of agents.

In one embodiment of the invention, once a call is routed to a particular group of agents, the call is placed in a queue so that the call is handled by the first available agent within that group, regardless of the agent's talent rating. However, in another embodiment of the invention, calls are automatically routed for processing to the most talented available agent within the group.

In one embodiment of the invention, if a call has been in a queue for a particular group of agents for a pre-determined period of time, the call is automatically redirected to a "backup" group of agents for processing. For example, in one embodiment of the invention, once a call has been in a queue for the first group of agents for more than two minutes, the call is automatically redirected to the second group of agents for processing. Similarly, once a call has been in a queue for the second group of agents for more than two minutes, the call is automatically redirected to the first group of agents for processing. By the same token, once a call has been in a queue for the third group of agents for more than two minutes, the call is automatically redirected to the second group of agents for processing. As will be understood by one skilled in this field in light of this disclosure, this setup for handling overflow calls may be modified to suit the needs of the particular system at issue.

Conclusion

Many modifications and other embodiments of the invention will come to mind to one skilled in the field to which this invention pertains having the benefit of this disclosure. For example, while one embodiment of the invention was described above as a system for routing incoming phone calls, the techniques above may also be applied to a system for routing other types of real-time or non-real-time correspondence, such as instant message and e-mail exchanges or other types of electronic correspondence. Similarly, the above techniques may also be applied to directing customers from a physical line of customers (e.g., a line of customers waiting for help at a customer service department) to an appropriate customer service representative.

In addition, although one embodiment of the invention was described above as providing three different groups of agents for handling different types of calls, the system may use more or less than three agent groups to handle these calls. For example, in one embodiment of the invention, the system uses only two groups to handle all incoming calls.

Also, as may be understood by one in the relevant field, the system may be configured to not include an automated call processing feature. For example, in one embodiment of the invention, after executing the step of determining a value of the call at Step 110, the system proceeds directly to the step of executing the Call Assignment Module 300. Thus, in this embodiment of the invention, Steps 120 and 140 (the steps of determining whether a call is below a threshold value and, if so, executing the Automated Call Processing Module) are eliminated.

In light of the above, it should be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What we claim is:

1. A call processing system that is configured for:
   assessing the importance of an incoming call; and
   routing said incoming call to a particular group of agents for processing based on said importance of said incoming call, wherein:
   at least one particular agent within said group of agents has been assigned to said group of agents based on said particular agent's talent performing one or more particular tasks;
   said particular agent's talent for performing one or more particular tasks is said particular agent's talent for persuading customers to retain a service; and
   said call processing system is configured for measuring said particular agent's talent for persuading customers to retain a service based on data comprising the length of time that one or more customers retained a service after speaking with said particular agent.

2. The call processing system of claim 1, wherein said call processing system is configured for:
   determining whether to route said incoming call to an automated call processing system based on said importance of said incoming call.

3. The call processing system of claim 1, wherein said call processing system is configured for routing said incoming call to said automated call processing system in response to determining to route said incoming call to an automated call processing system.

4. The system of claim 1, wherein said call processing system is configured for determining whether to route said incoming call to a human operator for processing based on said importance of said incoming call.

5. The call processing system of claim 1, wherein said call processing system is configured for:
   receiving data related to said incoming call;
   assigning a priority value to said incoming call based on said data; and
   using said priority value to determine whether to route said incoming call to an automated call processing system.

6. The system of claim 5, wherein said call processing system is configured for routing said incoming call to said automated call processing system in response to determining, based on said priority value, to route said incoming call to an automated call processing system.

7. The call processing system of claim 5, wherein said call processing system is configured for using said priority value to determine whether to route said incoming call to a human operator for processing.

8. The call processing system of claim 5, wherein said data is account data.

9. The call processing system of claim 1, wherein:
   said incoming call is related to the cancellation of a service; and
   said call processing system is configured for:
   determining whether it would be beneficial to attempt to persuade a customer not to cancel said service; and
   in response to determining that it would not be beneficial to attempt to persuade said customer not to cancel said service, routing said call to an automated call processing system.

10. The call processing system of claim 9, wherein said step of determining whether it would be beneficial to attempt to persuade said customer not to cancel said service comprises assessing whether an account associated with said call is likely to be profitable in the future.

11. The call processing system of claim 9, wherein said step of determining whether it would be beneficial to attempt to persuade said customer not to cancel said service comprises assessing whether an account associated with said call has been profitable in the past.

12. The call processing system of claim 1, wherein said call processing system is configured for:
processing calls from one or more individuals related to a particular service; and
allowing at least one of said individuals to cancel said particular service substantially without the assistance of a human operator.

13. The call processing system of claim 12, wherein said particular service is an insurance policy.

14. The call processing system of claim 1, wherein said call processing system is configured for:
receiving information related to said incoming call;
using said information to determine whether it would be beneficial to have a human representative handle said incoming call; and
in response to determining that it would not be beneficial to have a human representative handle said incoming call, routing said call to an automated call processing system.

15. The call processing system of claim 14, wherein said call processing system is configured for, in response to determining that it would be beneficial to have a human representative handle said incoming call, routing said call to a human representative for processing.

16. The call processing system of claim 1, wherein said service is an insurance policy.

17. The call processing system of claim 1, wherein said call processing system is configured for:
identifying, from a plurality of agents, a group of one or more "most talented" agents who are among the most talented agents within said plurality of agents at performing said one or more particular tasks; and
designating said group of agents as said particular group of agents.

18. The call processing system of claim 17, wherein said call processing system is further configured for routing said incoming call to said particular group of agents in response to determining that said incoming call is a relatively high-value call.

19. The call processing system of claim 17, wherein:
said particular group of agents is a first group of agents;
said call processing system is configured for identifying, from said plurality of agents, a second group of agents; and
said second group of agents is a group of one or more "least talented" agents who are among the least talented agents within said plurality of agents at performing said one or more particular tasks.

20. The call processing system of claim 19, wherein said call processing system is further configured for routing a particular call to said group of "least talented agents" in response to determining that said particular call is a relatively low-value call.

21. The call processing system of claim 1, wherein said call processing system is configured for:
assigning a first talent rating to a first agent;
assigning a second talent rating to a second agent;
assigning a third talent rating to a third agent;
in response to said first talent rating being above a pre-determined first threshold value, assigning said first agent to a first group of agents;
in response to said second talent rating being below a pro-determined second threshold value, assigning said second agent to a second group of agents;
in response to said third talent rating being below said first threshold value and above said second threshold value, assigning said third agent to a third group of agents; and
routing said incoming to a selected one of said first, second, or third groups of agents based, at least in part, on said importance of said incoming call.

22. The call processing system of claim 1, wherein said call processing system is configured for measuring said particular agent's talent for persuading customers to retain a service based on said particular agent's call save rate for one or more days.

23. The call processing system of claim 22, wherein said call processing system is configured for measuring said particular agent's talent for persuading customers to retain a service based on said particular agent's saved revenue value for one or more days.

24. The call processing system of claim 1, wherein said call processing system is configured for measuring said particular agent's talent for persuading customers to retain a service based on said particular agent's saved revenue value for one or more days.

25. A call processing system that is configured for:
assessing the importance of an incoming call; and
routing said incoming call to a particular group of agents for processing based on said importance of said incoming call, wherein:
at least one particular agent within said group of agents has been assigned to said group of agents based on said particular agent's talent for performing one or more particular tasks;
said particular agent's talent for performing one or more particular tasks is said particular agent's talent for persuading customers to retain a service; and
said call processing system is configured for measuring said particular agent's talent for persuading customers to retain a service based on said particular agent's call save rate for one or more days.

26. The call processing system of claim 25, wherein said call processing system is configured for:
determining whether to route said incoming call to an automated call processing system based on said importance of said incoming call.

27. The system of claim 26, wherein said system is configured for routing said incoming call to said automated call processing system in response to determining to route said incoming call to an automated call processing system.

28. The system of claim 25, wherein said call processing system is configured for determining whether to route said incoming call to a human operator for processing based on said importance of said incoming call.

29. The call processing system of claim 25, wherein said call processing system is configured for:
receiving data related to said incoming call;
assigning a priority value to said incoming call based on said data; and using said priority value to determine whether to route said incoming call to an automated call processing system.

30. The call processing system of claim 29, wherein said call processing system is configured for routing said incoming call to said automated call processing system in response to determining, based on said priority values, to route said incoming call to an automated call processing system.

31. The call processing system of claim 29, wherein said call processing system is configured for using said priority value to determine whether to route said incoming call to a human operator for processing.

32. The call processing system of claim 29, wherein said data is account data.

33. The call processing system of claim 25, wherein:
said incoming call is related to the cancellation of a service; and
said call processing system is configured for:
determining whether it would be beneficial to attempt to persuade a customer not to cancel said service; and
in response to determining that it would not be beneficial to attempt to persuade said customer not to cancel said service, routing said call to an automated call processing system.

34. The call processing system of claim 33, wherein said step of determining whether it would be beneficial to attempt to persuade said customer not to cancel said service comprises assessing whether an account associated with said call is likely to be profitable in the future.

35. The call processing system of claim 33, wherein said step of determining whether it would be beneficial to attempt to persuade said customer not to cancel said service comprises assessing whether an account associated with said call has been profitable in the past.

36. The call processing system of claim 25, wherein said call processing system is configured for:
processing calls from one or more individuals related to a particular service; and
allowing at least one of said individuals to cancel said particular service substantially without the assistance of a human operator.

37. The call processing system of claim 36, wherein said particular service is an insurance policy.

38. The call processing system of claim 25, wherein said call processing system is configured for:
receiving information related to said incoming call;
using said information to determine whether it would be beneficial to have a human representative handle said incoming call; and
in response to determining that it would not be beneficial to have a human representative handle said incoming call, routing said call to an automated call processing system.

39. The call processing system of claim 38, wherein said call processing system is configured for, in response to determining that it would be beneficial to have a human representative handle said incoming call, routing said call to a human representative for processing.

40. The call processing system of claim 25, wherein said service is an insurance policy.

41. The call processing system of claim 25, wherein said call processing system is configured for identifying, from a plurality of agents, a group of one or more "most talented" agents who are among the most talented agents within said plurality of agents at performing said one or more particular tasks; and designating said group of agents as said particular group of agents.

42. The call processing system of claim 41, wherein said call processing system is further configured for routing said incoming call to said particular group of agents in response to determining that said incoming call is a relatively high-value call.

43. The call processing system of claim 41, wherein:
said particular group of agents is a first group of agents;
said call processing system is configured for identifying, from said plurality of agents, a second group of agents; and
said second group of agents is a group of one or more "least talented" agents who are among the least talented agents within said plurality of agents at performing said one or more particular tasks.

44. The call processing system of claim 43, wherein said call processing system is further configured for routing a particular call to said group of "least talented agents" in response to determining that said particular call is a relatively low-value call.

45. The call processing system of claim 25, wherein said call processing system is configured for:
assigning a first talent rating to a first agent;
assigning a second talent rating to a second agent;
assigning a third talent rating to a third agent;
in response to said first talent rating being above a pre-determined first threshold value, assigning said first agent to a first group of agents;
in response to said second talent rating being below a pre-determined second threshold value, assigning said second agent to a second group of agents;
in response to said third talent rating being below said first threshold value and above said second threshold value, assigning said third agent to a third group of agents; and
routing said incoming call to a selected one of said first, second, or third groups of agents based, at least in part, on said importance of said incoming call.

46. The call processing system of claim 25, wherein said call processing system is configured for measuring said particular agent's talent for persuading customers to retain a service based on said particular agent's saved revenue value for one or more days.

47. A call processing system that is configured for:
assessing the importance of an incoming call; and
routing said incoming call to a particular group of agents for processing based on said importance of said incoming call, wherein:
at least one particular agent within said group of agents has been assigned to said group of agents based on said particular agent's talent for performing one or more particular tasks;
said particular agent's talent for performing one or more particular tasks is said particular agent's talent for persuading customers to retain a service; and
said call processing system is configured for measuring said particular agent's talent for persuading customers to retain a service based on said particular agent's saved revenue value for one or more days.

48. The call processing system of claim 47, wherein said call processing system is configured for:
determining whether to route said incoming call to an automated call processing system based on said importance of said incoming call.

49. The call processing system of claim 48, wherein said call processing system is configured for routing said incoming call to said automated call processing system in response to determining to route said incoming call to an automated call processing system.

50. The call processing system of claim 47, wherein said call processing system is configured for determining whether to route said incoming call to a human operator for processing based on said importance of said incoming call.

51. The call processing system of claim 47, wherein said call processing system is configured for:
receiving data related to said incoming call;
assigning a priority value to said incoming call based on said data; and
using said priority value to determine whether to route said incoming call to an automated call processing system.

52. The call processing system of claim 51, wherein said call processing system is configured for routing said incoming call to said automated call processing system in response to determining based on said priority value, to route said incoming call to an automated call processing system.

53. The call processing system of claim 51, wherein said call processing system is configured for using said priority value to determine whether to route said incoming call to a human operator for processing.

54. The call processing system of claim 51, wherein said data is account data.

55. The call processing system of claim 47, wherein:
said incoming call is related to the cancellation of a service; and
said call processing system is configured for:
determining whether it would be beneficial to attempt to persuade a customer not to cancel said service; and
in response to determining that it would not be beneficial to attempt to persuade said customer not to cancel said service, routing said call to an automated call processing system.

56. The call processing system of claim 55, wherein said step of determining whether it would be beneficial to attempt to persuade said customer not to cancel said service comprises assessing whether an account associated with said call is likely to be profitable in the future.

57. The call processing system of claim 55, wherein said step of determining whether it would be beneficial to attempt to persuade said customer not to cancel said service comprises assessing whether an account associated with said call has been profitable in the past.

58. The call processing system of claim 47, wherein said call processing system is configured for:
processing calls from one or more individuals related to a particular service; and
allowing at least one of said individuals to cancel said particular service substantially without the assistance of a human operator.

59. The call processing system of claim 58, wherein said particular service is an insurance policy.

60. The call processing system of claim 47, wherein said call processing system is configured for:
receiving information related to said incoming call;
using said information to determine whether it would be beneficial to have a human representative handle said incoming call; and
in response to determining that it would not be beneficial to have a human representative handle said incoming call, routing said call to an automated call processing system.

61. The call processing system of claim 60, wherein said call processing system is configured for, in response to determining that it would be beneficial to have a human representative handle said incoming call, routing said call to a human representative for processing.

62. The call processing system of claim 47, wherein said service is an insurance policy.

63. The call processing system of claim 47, wherein said call processing system is configured for identifying, from a plurality of agents, a group of one or more "most talented" agents who are among the most talented agents within said plurality of agents at performing said one or more particular tasks; and
designating said group of agents as said particular group of agents.

64. The call processing system of claim 63, wherein said call processing system is further configured for routing said incoming call to said particular group of agents in response to determining that said incoming call is a relatively high-value call.

65. The call processing system of claim 63, wherein:
said particular group of agents is a first group of agents;
said call processing system is configured for identifying, from said plurality of agents, a second group of agents; and
said second group of agents is a group of one or more "least talented" agents who are among the least talented agents within said plurality of agents at performing said one or more particular tasks.

66. The call processing system of claim 65, wherein said call processing system is further configured for routing a particular call to said group of "least talented agents" in response to determining that said particular call is a relatively low-value call.

67. The call processing system of claim 47, wherein said call processing system is configured for:
assigning a first talent rating to a first agent;
assigning a second talent rating to a second agent;
assigning a third talent rating to a third agent;
in response to said first talent rating being above a pre-determined first threshold value, assigning said first agent to a first group of agents;
in response to said second talent rating being below a pre-determined second threshold value, assigning said second agent to a second group of agents;
in response to said third talent rating being below said first threshold value and above said second threshold value, assigning said third agent to a third group of agents; and
routing said incoming call to a selected one of said first, second, or third groups of agents based, at least in part, on said importance of said incoming call.

* * * * *